United States Patent
Clarke et al.

(10) Patent No.: US 10,549,914 B2
(45) Date of Patent: Feb. 4, 2020

(54) STORAGE SYSTEMS AND METHODS

(71) Applicant: Ocado Innovation Limited, Hertfordshire (GB)

(72) Inventors: Paul Clarke, Hertfordshire (GB); Lars Sverker Ture Lindbo, Hertfordshire (GB); Andrew John Ingram-Tedd, Hertfordshire (GB); Pawel Karolinczak, Hertfordshire (GB)

(73) Assignee: OCADO INNOVATION LIMITED, Hatfield, Hertfordshire (GB)

( * ) Notice: Subject to any disclaimer, the term of this patent is extended or adjusted under 35 U.S.C. 154(b) by 0 days.

(21) Appl. No.: 15/555,841

(22) PCT Filed: Apr. 15, 2016

(86) PCT No.: PCT/EP2016/058466
§ 371 (c)(1),
(2) Date: Sep. 5, 2017

(87) PCT Pub. No.: WO2016/166353
PCT Pub. Date: Oct. 20, 2016

(65) Prior Publication Data
US 2018/0044111 A1    Feb. 15, 2018

(30) Foreign Application Priority Data

Apr. 15, 2015 (GB) .................................. 1506365.4
Aug. 13, 2015 (GB) .................................. 1514428.0
(Continued)

(51) Int. Cl.
*G06F 7/00*     (2006.01)
*B65G 1/04*     (2006.01)
(Continued)

(52) U.S. Cl.
CPC .......... *B65G 1/0464* (2013.01); *A01G 9/022* (2013.01); *A01G 9/16* (2013.01); *A01G 31/06* (2013.01);
(Continued)

(58) Field of Classification Search
None
See application file for complete search history.

(56) References Cited

U.S. PATENT DOCUMENTS 2,701,065 A    2/1955   Bertel
3,744,193 A    7/1973   Lau
(Continued)

FOREIGN PATENT DOCUMENTS

DE    2719953 A    7/1978
DE    4439740 C1   5/1996
(Continued)

OTHER PUBLICATIONS

The first application names Lars Sverker Ture Lindbo; Andrew John Ingram-Tedd; Pawel Karolinczak; and Matthew Whelan as inventors, is entitled "Robotic Container Handling Device and Method".
(Continued)

*Primary Examiner* — Yolanda R Cumbess
(74) *Attorney, Agent, or Firm* — Buchanan Ingersoll & Rooney PC

(57) ABSTRACT

A storage system is described where goods are stored in containers and the containers are stored in stacks. Above the stacks runs a grid network of tracks on which load handling devices run. The load handling devices take containers from the stacks and deposit then at alternative locations in the stacks or deposit then at stations where goods may be picked out. The framework may be provided with one or more of the following services: power, power control, heating, lighting, cooling, sensing, and data logging. The provision of
(Continued)

these services within the framework rather than across the system as a whole, allows for flexibility in storage whilst reducing cost and inefficiency.

21 Claims, 11 Drawing Sheets

(30) Foreign Application Priority Data

| Oct. 13, 2015 | (GB) | 1518089.6 |
|---|---|---|
| Oct. 13, 2015 | (GB) | 1518091.2 |
| Oct. 13, 2015 | (GB) | 1518094.6 |
| Oct. 13, 2015 | (GB) | 1518111.8 |
| Oct. 13, 2015 | (GB) | 1518115.9 |
| Oct. 13, 2015 | (GB) | 1518117.5 |
| Feb. 9, 2016 | (GB) | 1602332.7 |
| Feb. 25, 2016 | (GB) | 1603328.4 |

(51) Int. Cl.

| A01G 9/16 | (2006.01) |
|---|---|
| A01G 31/06 | (2006.01) |
| B62D 33/02 | (2006.01) |
| B65G 63/00 | (2006.01) |
| B65G 67/02 | (2006.01) |
| B65G 1/06 | (2006.01) |
| B65G 57/03 | (2006.01) |
| E04B 1/348 | (2006.01) |
| E06B 9/68 | (2006.01) |
| A01G 9/02 | (2018.01) |
| A47L 7/00 | (2006.01) |
| B65G 1/137 | (2006.01) |
| B65D 21/02 | (2006.01) |
| A01G 9/18 | (2006.01) |

(52) U.S. Cl.
CPC ............ *A47L 7/0047* (2013.01); *B62D 33/02* (2013.01); *B62D 33/0207* (2013.01); *B65D 21/0212* (2013.01); *B65G 1/0478* (2013.01); *B65G 1/065* (2013.01); *B65G 1/137* (2013.01); *B65G 57/03* (2013.01); *B65G 63/004* (2013.01); *B65G 67/02* (2013.01); *E04B 1/34807* (2013.01); *E06B 9/68* (2013.01); *A01G 9/18* (2013.01); *B65G 1/0407* (2013.01); *B65G 2207/22* (2013.01); *B65G 2207/40* (2013.01); *E06B 2009/6818* (2013.01); *Y02A 40/254* (2018.01); *Y02P 60/148* (2015.11); *Y02P 60/216* (2015.11); *Y10S 901/01* (2013.01)

(56) References Cited

U.S. PATENT DOCUMENTS

| 4,088,232 A | 5/1978 | Lilly |
|---|---|---|
| 4,561,554 A | 12/1985 | Swincicki |
| 4,599,829 A | 7/1986 | Dimartino, Sr. |
| 4,723,381 A | 2/1988 | Straumsnes |
| 4,917,429 A | 4/1990 | Giger |
| 4,973,219 A | 11/1990 | Brickner et al. |
| 6,152,287 A | 11/2000 | Luria |
| 6,654,662 B1 | 11/2003 | Hognaland |
| 8,408,863 B1 | 4/2013 | Benedict et al. |
| 8,628,289 B1 | 1/2014 | Benedict et al. |
| 2002/0057956 A1 | 5/2002 | Jephcott |
| 2003/0005626 A1 | 1/2003 | Yoneda et al. |
| 2003/0141973 A1 | 7/2003 | Yeh et al. |
| 2003/0156501 A1 | 8/2003 | Spindel et al. |
| 2004/0016624 A1 | 1/2004 | Jephcott |
| 2005/0220573 A1 | 10/2005 | Benedict et al. |
| 2006/0201377 A1 | 9/2006 | Gielow |
| 2007/0016328 A1 | 1/2007 | Ziegler et al. |
| 2008/0075566 A1 | 3/2008 | Benedict et al. |
| 2008/0075568 A1 | 3/2008 | Benedict et al. |
| 2008/0075569 A1* | 3/2008 | Benedict ............... B65G 1/0464 414/269 |
| 2008/0134458 A1 | 6/2008 | Ziegler et al. |
| 2008/0140255 A1 | 6/2008 | Ziegler et al. |
| 2008/0155768 A1 | 7/2008 | Ziegler et al. |
| 2008/0213073 A1* | 9/2008 | Benedict ............... B65G 63/004 414/279 |
| 2010/0275512 A1 | 11/2010 | Nien |
| 2011/0027059 A1 | 2/2011 | Benedict et al. |
| 2011/0192082 A1 | 8/2011 | Uchiyama |
| 2011/0271469 A1 | 11/2011 | Ziegler et al. |
| 2012/0036659 A1 | 2/2012 | Ziegler et al. |
| 2012/0147558 A1 | 6/2012 | Dunn, Jr. et al. |
| 2012/0272500 A1 | 11/2012 | Camenisch et al. |
| 2013/0011226 A1 | 1/2013 | Camenisch et al. |
| 2014/0026474 A1 | 1/2014 | Kulas |
| 2014/0034662 A1* | 2/2014 | Chalmers ............... B65D 25/22 220/737 |
| 2014/0069007 A1 | 3/2014 | Chen et al. |
| 2014/0191633 A1 | 7/2014 | Zhu et al. |
| 2014/0283452 A1* | 9/2014 | Dittman ............... A01G 31/06 47/62 R |
| 2014/0289992 A1 | 10/2014 | Ziegler et al. |
| 2015/0045944 A1 | 2/2015 | Visser et al. |
| 2015/0127143 A1 | 5/2015 | Lindbo et al. |
| 2016/0095309 A1 | 4/2016 | Camenisch et al. |
| 2016/0129587 A1 | 5/2016 | Lindbo et al. |
| 2016/0140488 A1 | 5/2016 | Lindbo |

FOREIGN PATENT DOCUMENTS

| DE | 10 2011 103443 A1 | 12/2012 |
|---|---|---|
| DE | 10 2012 025154 A1 | 6/2014 |
| EP | 0 767 113 B1 | 7/2002 |
| EP | 1037828 B1 | 9/2003 |
| EP | 2 133 289 A1 | 12/2009 |
| EP | 2 308 283 A1 | 4/2011 |
| EP | 2 783 913 A2 | 10/2014 |
| EP | 2 829 210 A2 | 1/2015 |
| GB | 1157145 A | 7/1969 |
| GB | 2514930 A | 12/2014 |
| GB | 2518259 A | 3/2015 |
| GB | 2520104 A | 5/2015 |
| GB | 2527543 A | 12/2015 |
| GB | 2528573 A | 1/2016 |
| GB | 2529029 A | 2/2016 |
| GB | 2529527 A | 2/2016 |
| JP | 09-299496 A | 11/1997 |
| JP | 2000-255786 A | 9/2000 |
| LU | 88 754 A1 | 10/1996 |
| NO | 317366 B1 | 10/2004 |
| WO | WO 92/04713 A1 | 3/1992 |
| WO | WO 97/38928 A1 | 10/1997 |
| WO | WO 98/49075 A1 | 11/1998 |
| WO | WO 03/031285 A1 | 4/2003 |
| WO | WO 03/095339 A1 | 11/2003 |
| WO | WO 2004/096609 A1 | 11/2004 |
| WO | WO 2008/108845 A2 | 9/2008 |
| WO | WO 2011/047710 A1 | 4/2011 |
| WO | WO 2013/082601 A1 | 6/2013 |
| WO | WO 2013/147597 A1 | 10/2013 |
| WO | WO 2013/162192 A1 | 10/2013 |
| WO | WO 2013/167907 A1 | 11/2013 |
| WO | WO 2013/169110 A1 | 11/2013 |
| WO | WO 2014/195901 A1 | 12/2014 |
| WO | WO 2014/203126 A1 | 12/2014 |
| WO | WO 2015/105426 A1 | 7/2015 |

OTHER PUBLICATIONS

The second application names Lars Sverker Ture Lindbo; Paul Clarke; Andrew John Ingram-Tedd; and Pawel Karolinczak as inventors, is entitled "Storage System and Methods".

(56) References Cited

OTHER PUBLICATIONS

The third application names Paul Clarke; Lars Sverker Ture Lindbo; Andrew John Ingram-Tedd; James Waddilove; and Jonty Angel as inventors, is entitled "System and Method For Configuration of Buildings or Storage".
The fourth application names Paul Clarke; Lars Sverker Ture Lindbo; and Andrew John Ingram-Tedd as inventors, is entitled "Storage System With Partition Means and Methods".
The fifth application names Lars Sverker Ture Lindbo; and Andrew John Ingram-Tedd as inventors, is entitled "Robotic Picking System Device and Method".
The sixth application names Lars Sverker Ture Lindbo; and Andrew John Ingram-Tedd as inventors, is entitled "Object Handling System and Method".
The seventh application names Lars Sverker Ture Lindbo; Paul Clarke; Andrew John Ingram-Tedd; Pawel Karolinczak; and Alexander Howard Whitaker as inventors, is entitled "Growing System and Method".
International Search Report (PCT/ISA/210) dated Jul. 15, 2016, by the European Patent Office as the International Searching Authority for International Application No. PCT/EP2016/058467.
Written Opinion (PCT/ISA/237) dated Jul. 15, 2016, by the Japanese Patent Office as the International Searching Authority for International Application No. PCT/EP2016/058467.
International Search Report (PCT/ISA/210) dated Jul. 20, 2016, by the European Patent Office as the International Searching Authority for International Application No. PCT/EP2016/058466.
Written Opinion (PCT/ISA/237) dated Jul. 20, 2016, by the Japanese Patent Office as the International Searching Authority for International Application No. PCT/EP2016/058466.
International Search Report (PCT/ISA/210) dated Jul. 18, 2016, by the European Patent Office as the International Searching Authority for International Application No. PCT/EP2016/058405.
Written Opinion (PCT/ISA/237) dated Jul. 18, 2016, by the Japanese Patent Office as the International Searching Authority for International Application No. PCT/EP2016/058405.
International Search Report (PCT/ISA/210) dated Jul. 14, 2016, by the European Patent Office as the International Searching Authority for International Application No. PCT/EP2016/058385.
Written Opinion (PCT/ISA/237) dated Jul. 14, 2016, by the Japanese Patent Office as the International Searching Authority for International Application No. PCT/EP2016/058385.
International Search Report (PCT/ISA/210) dated Jul. 19, 2016, by the European Patent Office as the International Searching Authority for International Application No. PCT/EP2016/058384.
Written Opinion (PCT/ISA/237) dated Jul. 19, 2016, by the Japanese Patent Office as the International Searching Authority for International Application No. PCT/EP2016/058384.
International Search Report (PCT/ISA/210) dated Jul. 18, 2016, by the European Patent Office as the International Searching Authority for International Application No. PCT/EP2016/058381.
Written Opinion (PCT/ISA/237) dated Jul. 18, 2016, by the Japanese Patent Office as the International Searching Authority for International Application No. PCT/EP2016/058381.
International Search Report (PCT/ISA/210) dated Aug. 30, 2016, by the European Patent Office as the International Searching Authority for International Application No. PCT/EP2016/058366.
Written Opinion (PCT/ISA/237) dated Aug. 30, 2016, by the Japanese Patent Office as the International Searching Authority for International Application No. PCT/EP2016/058366.
International Search Report (PCT/ISA/210) dated Jul. 14, 2016, by the European Patent Office as the International Searching Authority for International Application No. PCT/EP2016/058407.
Written Opinion (PCT/ISA/237) dated Jul. 14, 2016, by the Japanese Patent Office as the International Searching Authority for International Application No. PCT/EP2016/058407.
Search Report dated Dec. 22, 2016, by the European Patent Office for Application No. 1606679.7.
Search Report dated Dec. 21, 2016, by the European Patent Office for Application No. 1606677.1.
Search Report dated Mar. 8, 2016, by the European Patent Office for Application No. 1518089.6.

* cited by examiner

STORAGE SYSTEMS AND METHODS

The present invention relates to storage systems. More specifically but not exclusively, it relates to storage systems having storage bins in stacks, the stacks being located with a grid structure.

This application claims priority from UK Patent Application Nos. GB1506365.4 filed 15 Apr. 2015, GB1514428.0 filed 13 Aug. 2015, GB1518089.6 filed 13 Oct. 2015, GB1602332.7 filed 9 Feb. 2016, GB1518091.2 filed 13 Oct. 2015, GB1518094.6 filed 13 Oct. 2015, GB1518111.8 filed 13 Oct. 2015, GB1518115.9 filed 13 Oct. 2015, GB1518117.5 filed 13 Oct. 2015 and GB1603328.4 filed 25 Feb. 2016 the content of all these applications hereby being incorporated by reference.

Some commercial and industrial activities require systems that enable the storage and retrieval of a large number of different products. One known type of system for the storage and retrieval of items in multiple product lines involves arranging storage bins or containers in stacks on top of one another, the stacks being arranged in rows. The storage bins or containers are accessed from above by load handling devices, removing the need for aisles between the rows and allowing more containers to be stored in a given space.

Methods of handling containers stacked in rows have been well known for decades. In some such systems, for example as described in U.S. Pat. No. 2,701,065, to Bertel comprise free-standing stacks of containers arranged in rows in order to reduce the storage volume associated with storing such containers but yet still providing access to a specific container if required. Access to a given container is made possible by providing relatively complicated hoisting mechanisms which can be used to stack and remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 0 767 113 B to Cimcorp. '113 discloses a mechanism for removing a plurality of stacked containers, using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack).

In the system described in '113, the height of the tube has to be as least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler.

EP 1037828 B1 (Autostore) the contents of which are incorporated herein by reference, describes a system in which stacks of containers are arranged within a frame structure. A system of this type is illustrated schematically in FIGS. 1 to 4 of the accompanying drawings. Robotic load handling devices can be controllably moved around the stack on a system of tracks on the upper most surface of the stack.

Other forms of robotic load handling device are further described in, for example, Norwegian patent number 317366, the contents of which are incorporated herein by reference. FIGS. 3(*a*) and 3(*b*) are schematic perspective views of a load handling device from the rear and front, respectively, and FIG. 3(*c*) is a schematic front perspective view of a load handling device lifting a bin.

A further development of load handling device is described in UK Patent Application No. GB1314313.6 Ocado Innovation Limited where each robotic load handler only covers one grid space, thus allowing higher density of load handlers and thus higher throughput of a given size system. However, any suitable form of load handling device may be used.

In such known storage systems a large number of bins are stacked densely. The contents of the bins may degrade, may require lighting, heating or cooling, or may need some form of monitoring or control not currently provided by known systems.

According to the invention there is provided a storage system comprising: a first set of parallel rails or tracks and a second set of parallel rails or tracks extending transverse to the first set in a substantially horizontal plane to form a grid pattern comprising a plurality of grid spaces; a set of uprights, the uprights and tracks together defining a framework; a plurality of storage containers arranged in stacks, located beneath the rails and within the framework; at least one load handling device disposed on the grid, arranged to move laterally above the stacks on the rails, the load handling device comprising a lifting device arranged to lift one or more containers, or parts thereof, from a stack; wherein the framework comprises service means for providing services to the storage system enabling interaction, control and monitoring of the system from within the framework.

According to the invention there is further provided a method of condition monitoring a storage system comprising the steps of: providing sensor means and data logging and storage means within the framework; providing communication means to communicate data logged to a central data logging device; and monitoring the data received.

Advantageously, in accordance with one form of the invention, the uprights of the frame structure carry services such as power, water supply, data communications means, lighting means and sensing means throughout the frame structure.

In accordance with a further aspect of the invention, the services may be directed from the uprights to the individual bins, for example water may be sprayed on to the bins from the uprights.

In accordance with yet another aspect of the invention, the uprights may carry sensing means to detect fire, smoke, heat or gas within the frame structure.

In accordance with a further aspect of the invention, the uprights may comprise power supply cabling or data communications cabling such as fibre optics.

In this way, depending on the services required within the storage system or provided in individual bins, aspects of the storage system may be controlled or monitored for data relating to the contents of the bins to be relayed to a central processing system. Furthermore, services and conditions within the containers or bins may be controlled, for example temperature, moisture, lighting or other parameters via control or monitoring means supplied via the uprights of the frame system. Control functions may be provided either by a local control system in the bin or by a central system sending signals to actuators in the bins via the uprights. Data transmitted may provide information on the condition of the bins, the contents of the bins or may provide information on the condition of the storage system in the vicinity of a given upright. Furthermore, in this way, the bins may be heated or cooled as required by the specific contents of the bin.

In this way, the present invention overcomes the problems of the prior art and provides a system and method of increasing the reliability and reducing the overall cost of large bin handling storage systems.

The invention will now be described with reference to the accompanying diagrammatic drawings in which.

Figure 1:
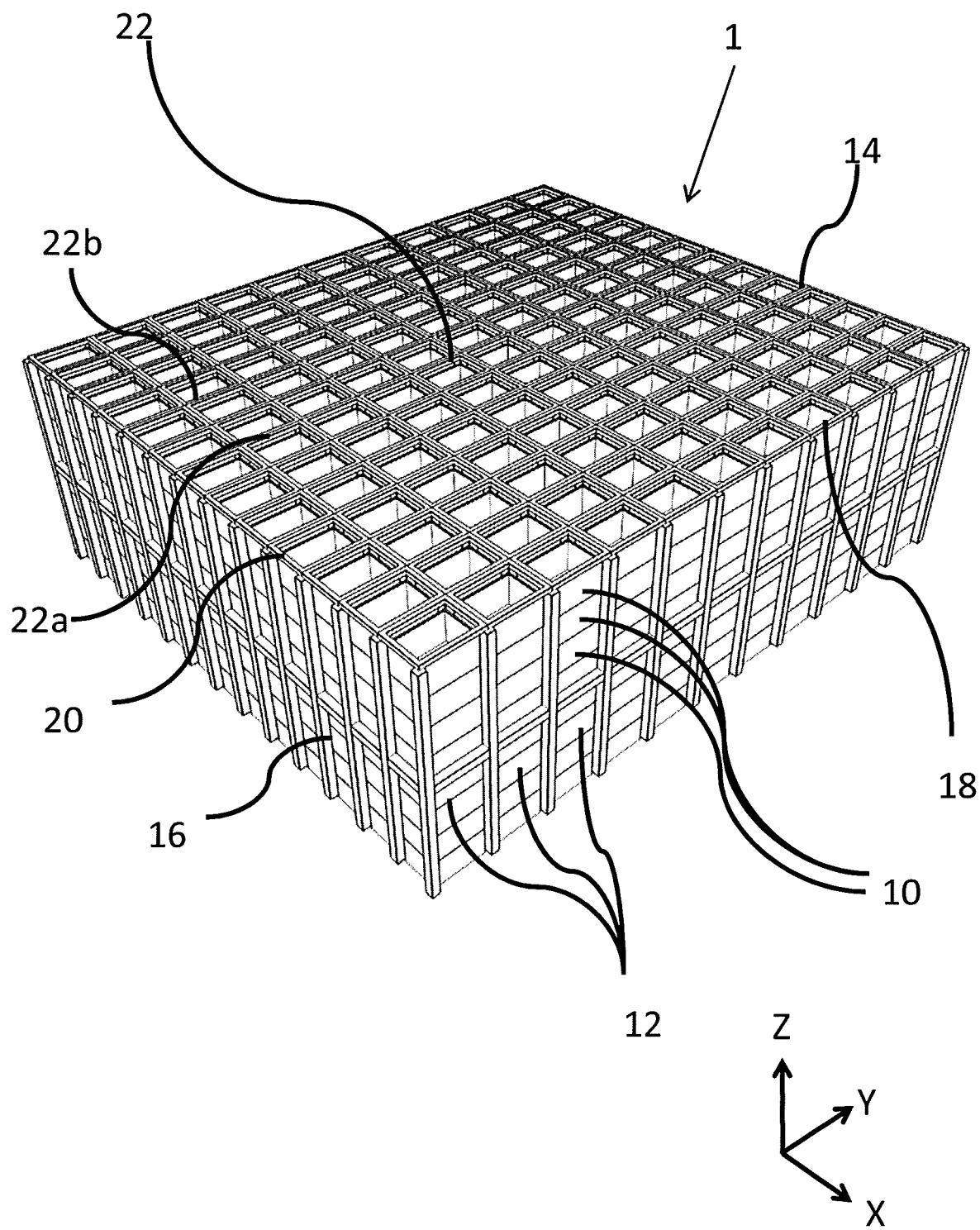
FIG. 1 is a schematic perspective view of a frame structure for housing a plurality of stacks of bins in a storage system.
Figure 2:
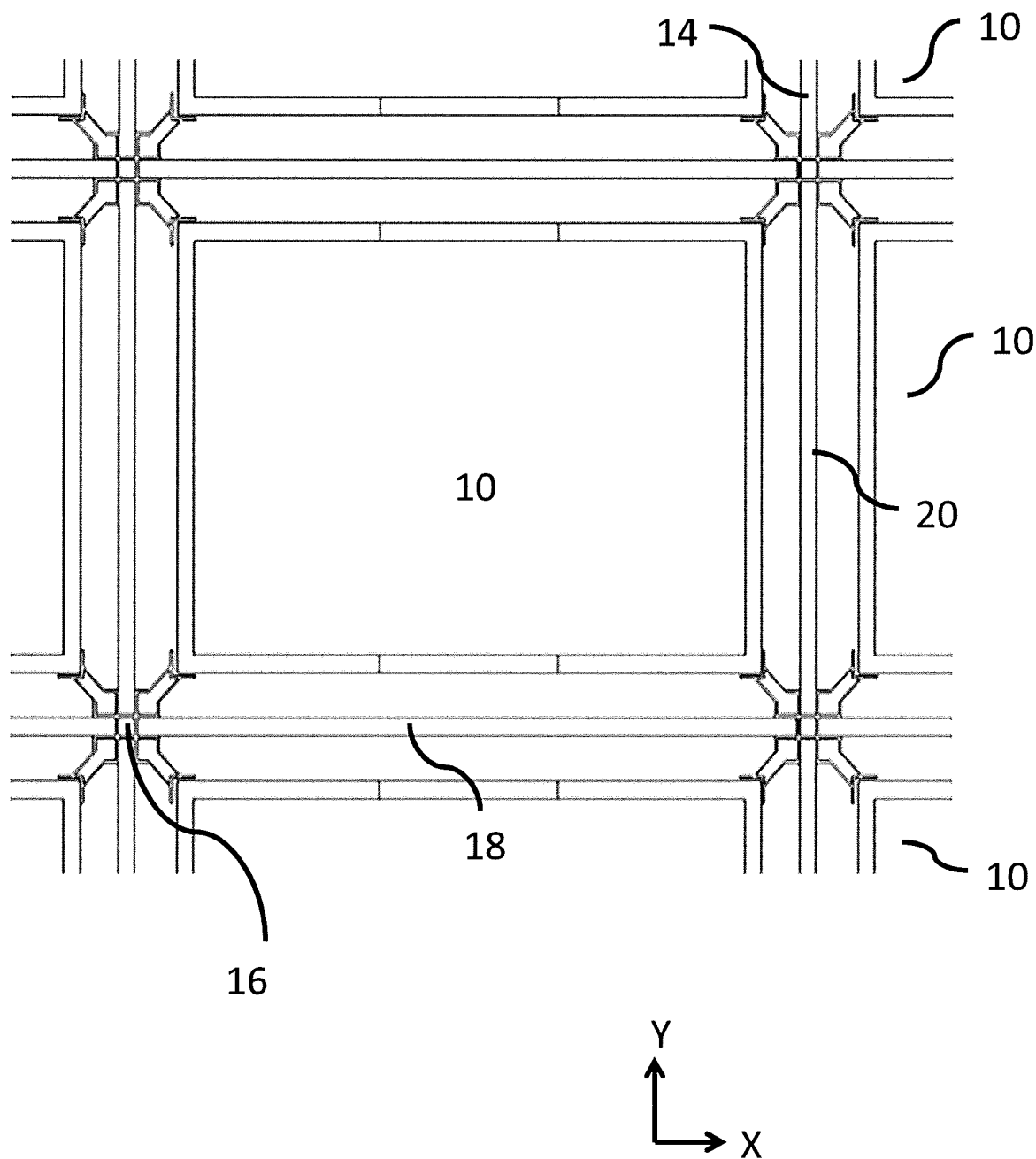
FIG. 2 is a schematic plan view of part of the frame structure of FIG. 1.
Figure 3A:
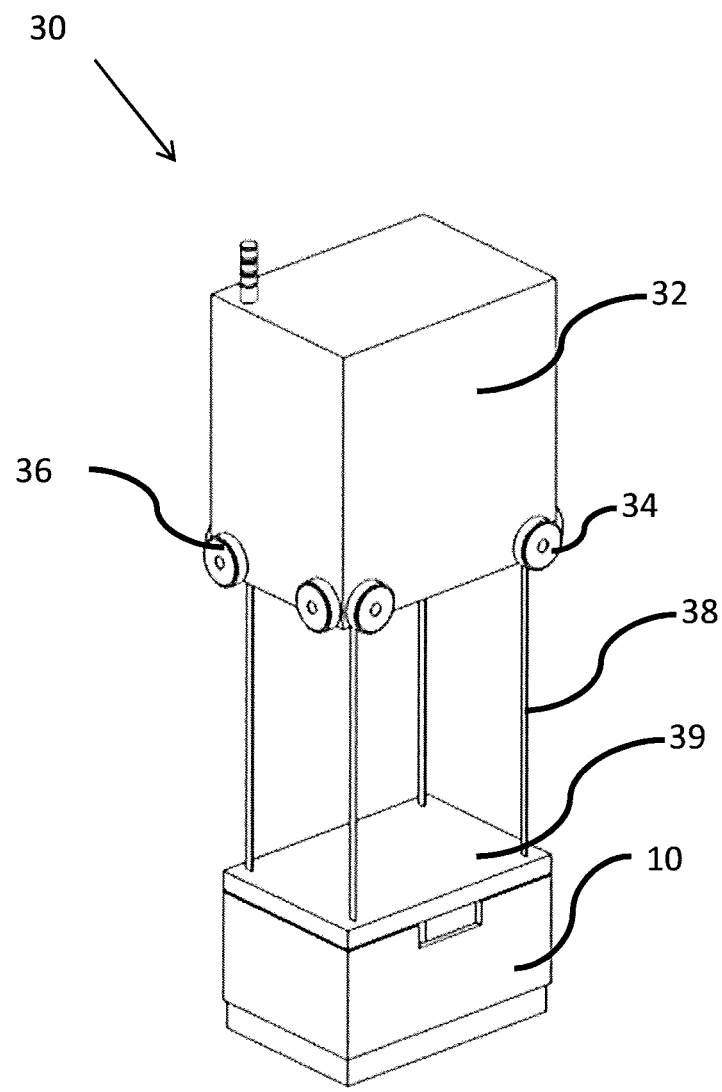
Figures 3B, 3C:
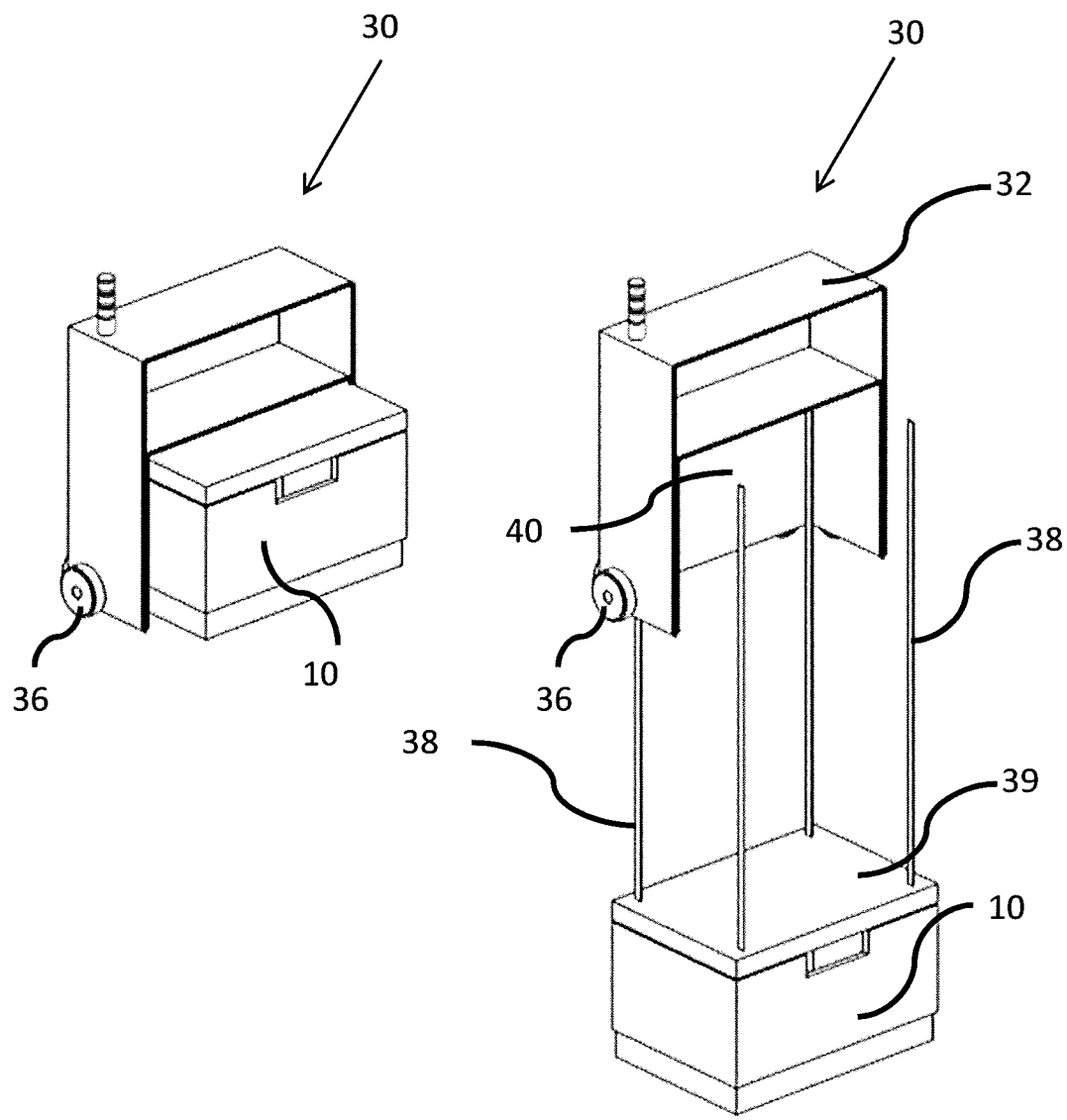
Figure 4:
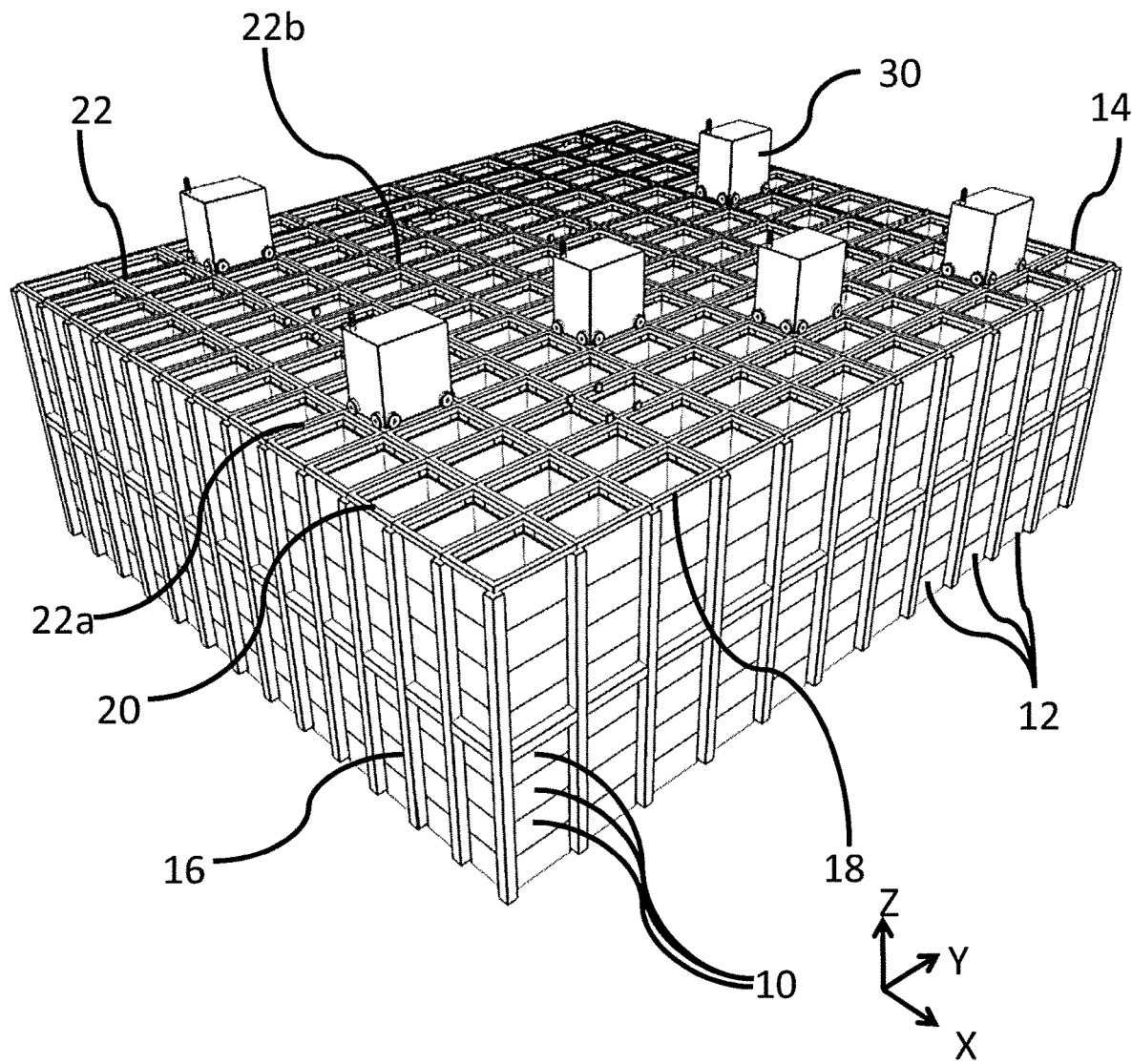

FIGS. 3(a) and 3(b) are schematic perspective views, from the rear and front respectively, of one form of robotic load handling device for use with the frame structure of FIGS. 1 and 2, and FIG. 3(c) is a schematic perspective view of the known load handler device in use lifting a bin;

FIG. 4 is a schematic perspective view of a known storage system comprising a plurality of load handling devices of the type shown in FIGS. 3(a), 3(b) and 3(c), installed on the frame structure of FIGS. 1 and 2, together with a robotic service device in accordance with one form of the invention.

Figure 5A:
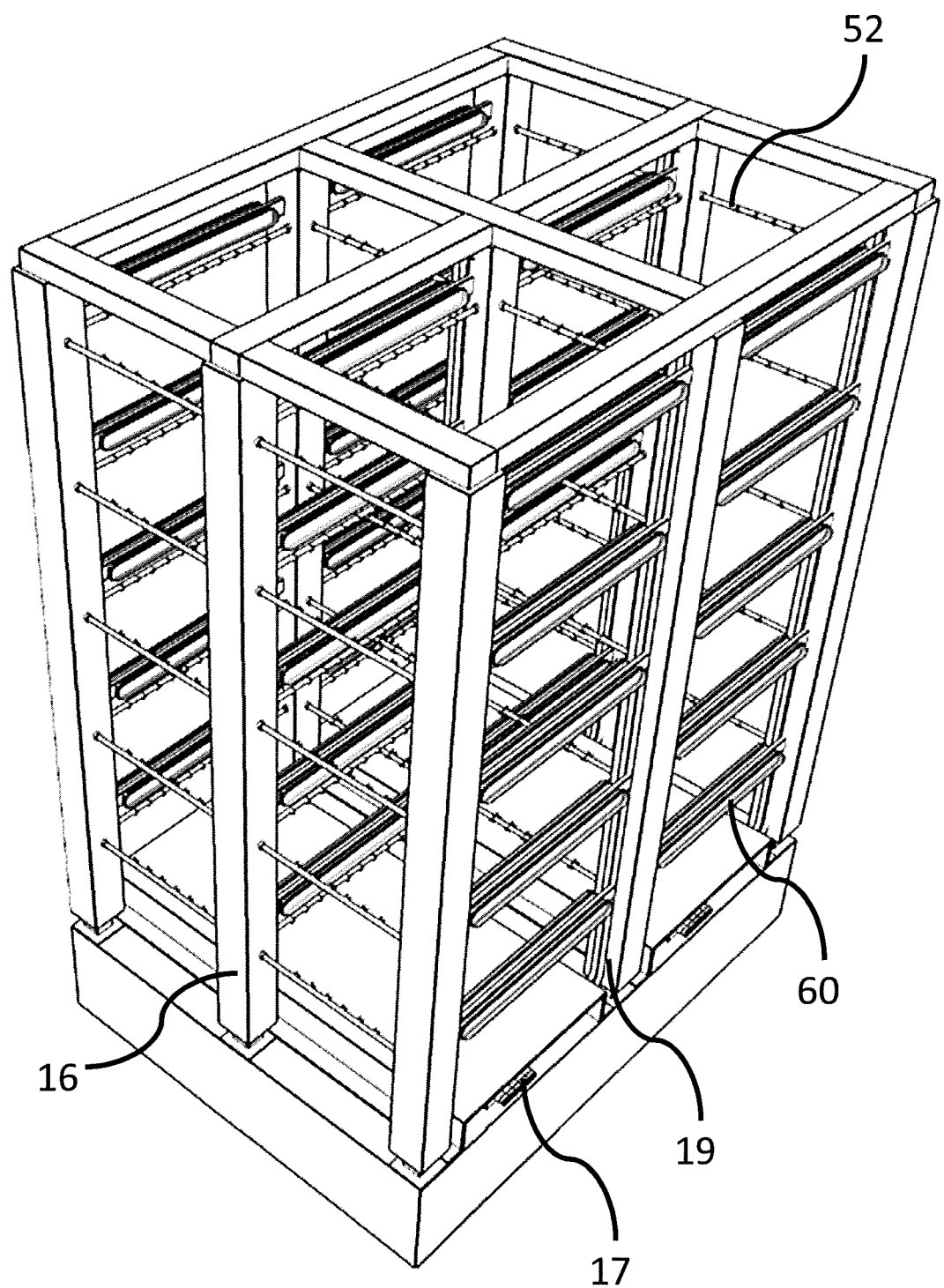
Figure 5B:
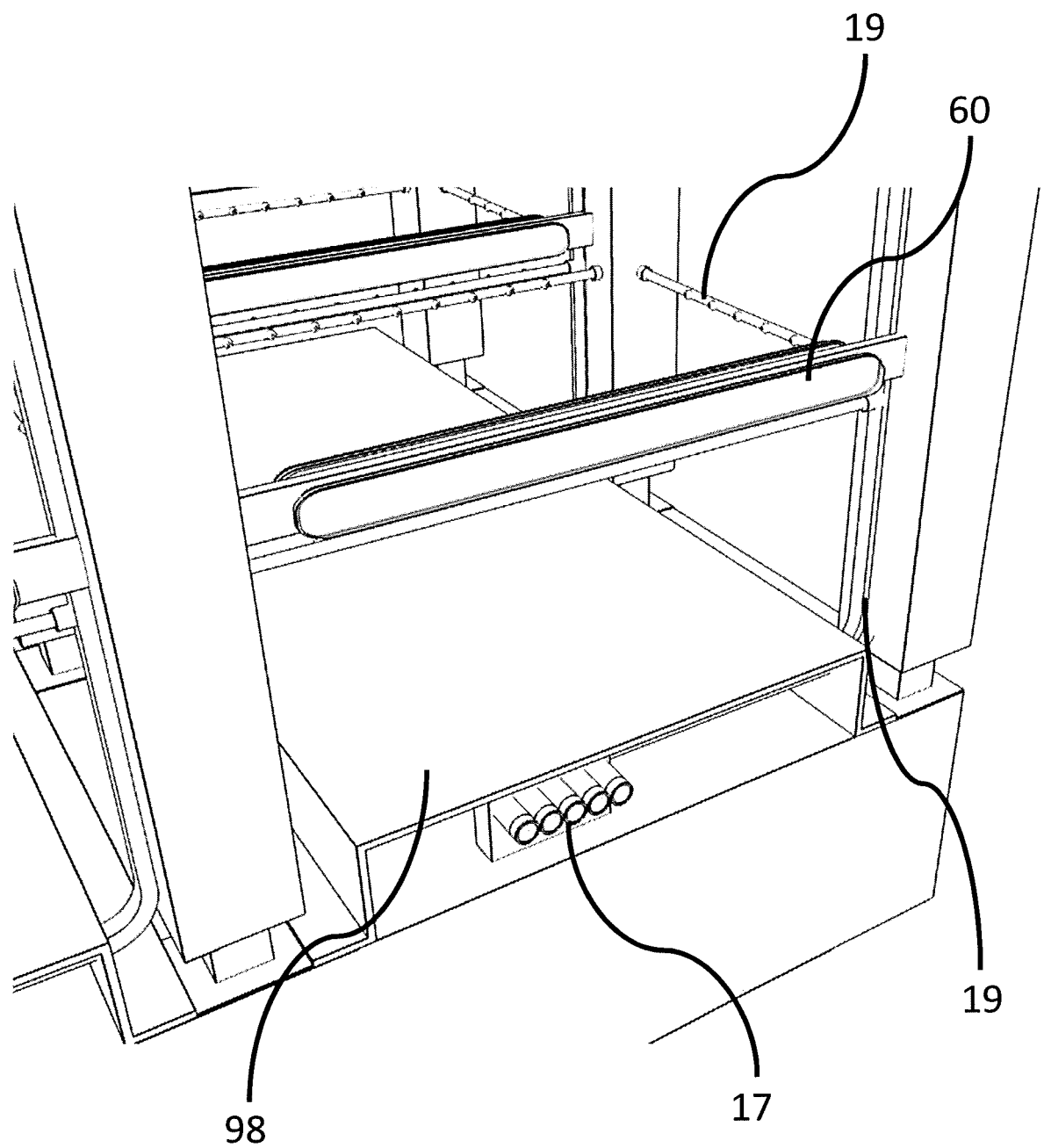
Figure 6:
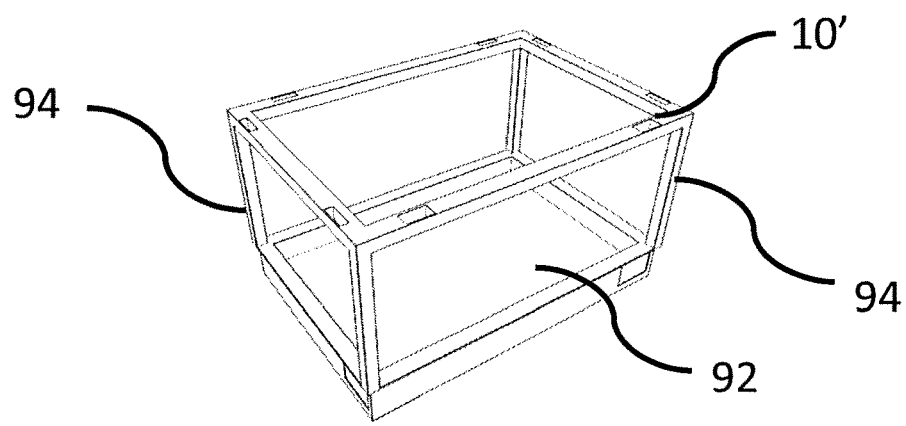
Figure 7:
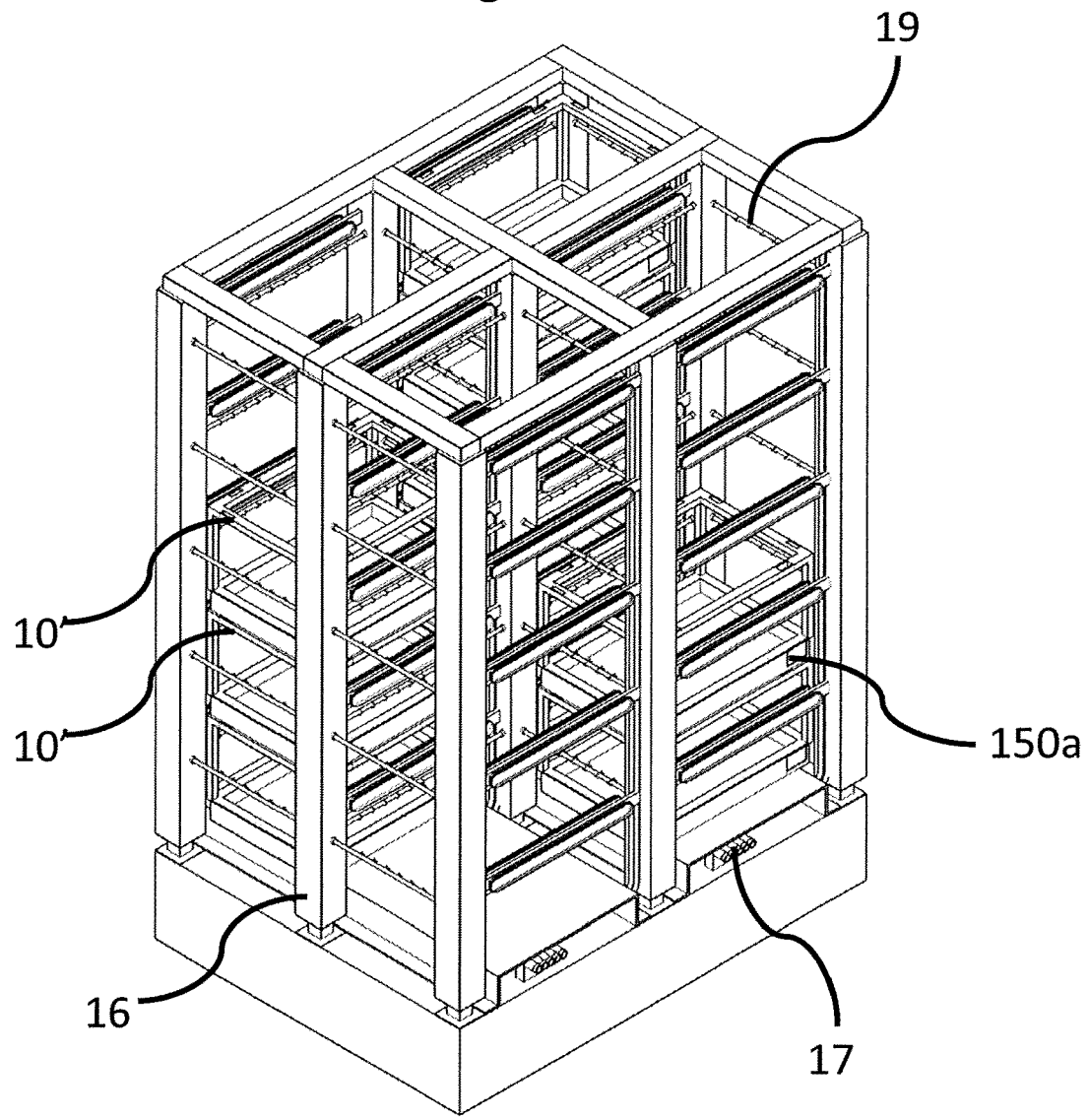
Figure 8:
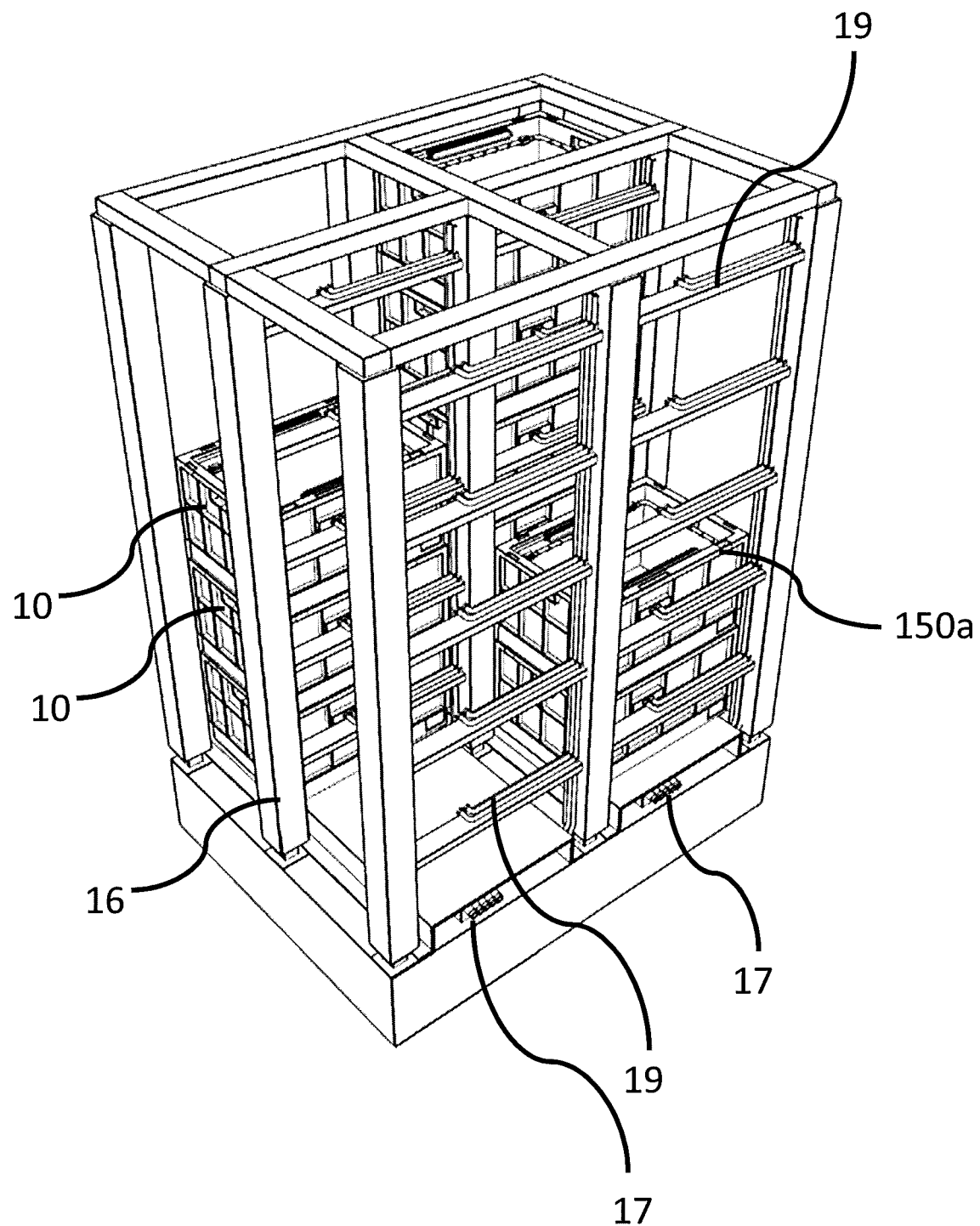
Figure 9:
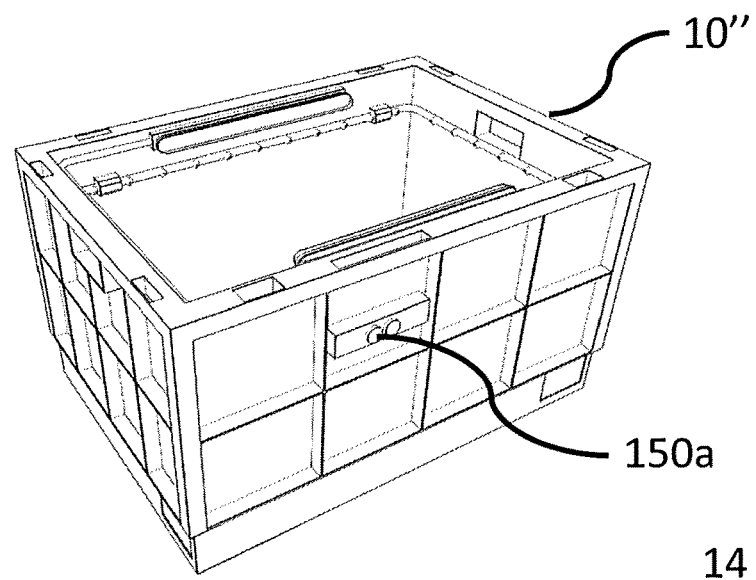
Figure 10:
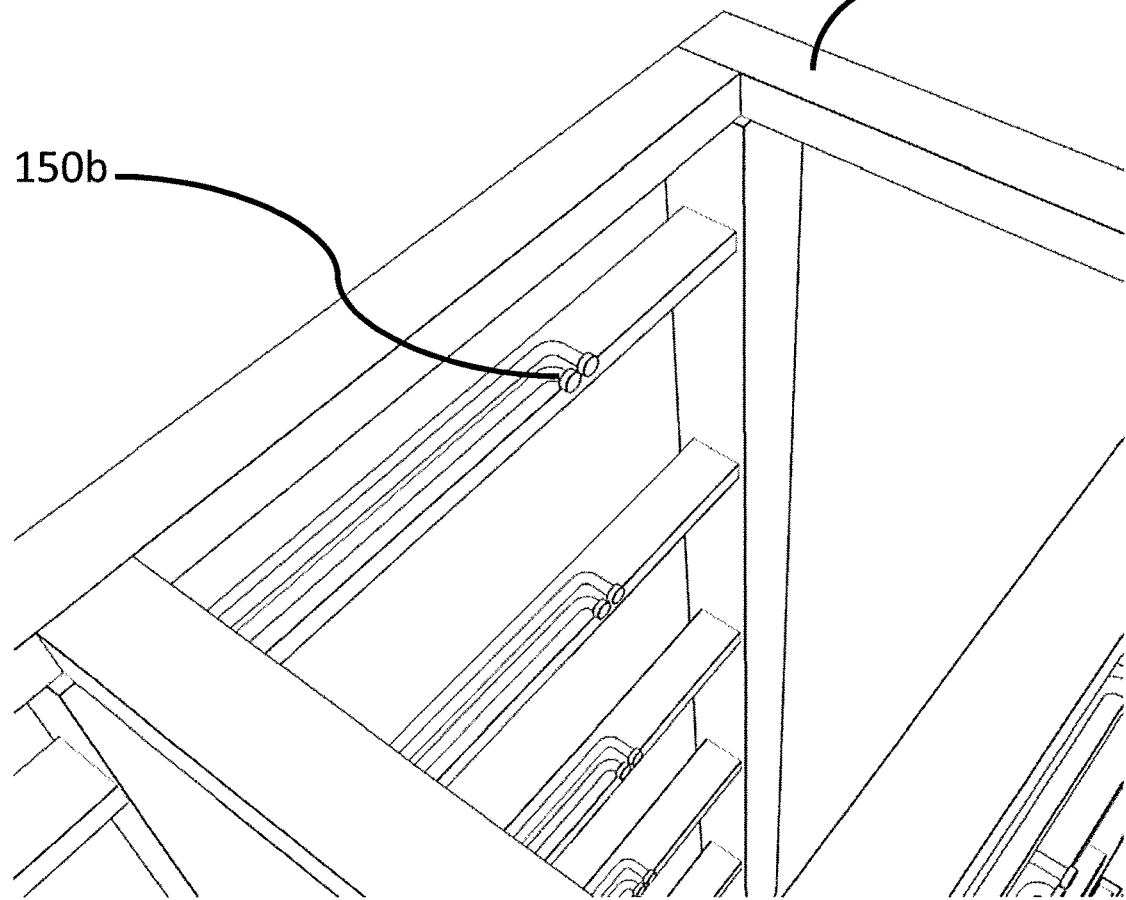
Figure 11:
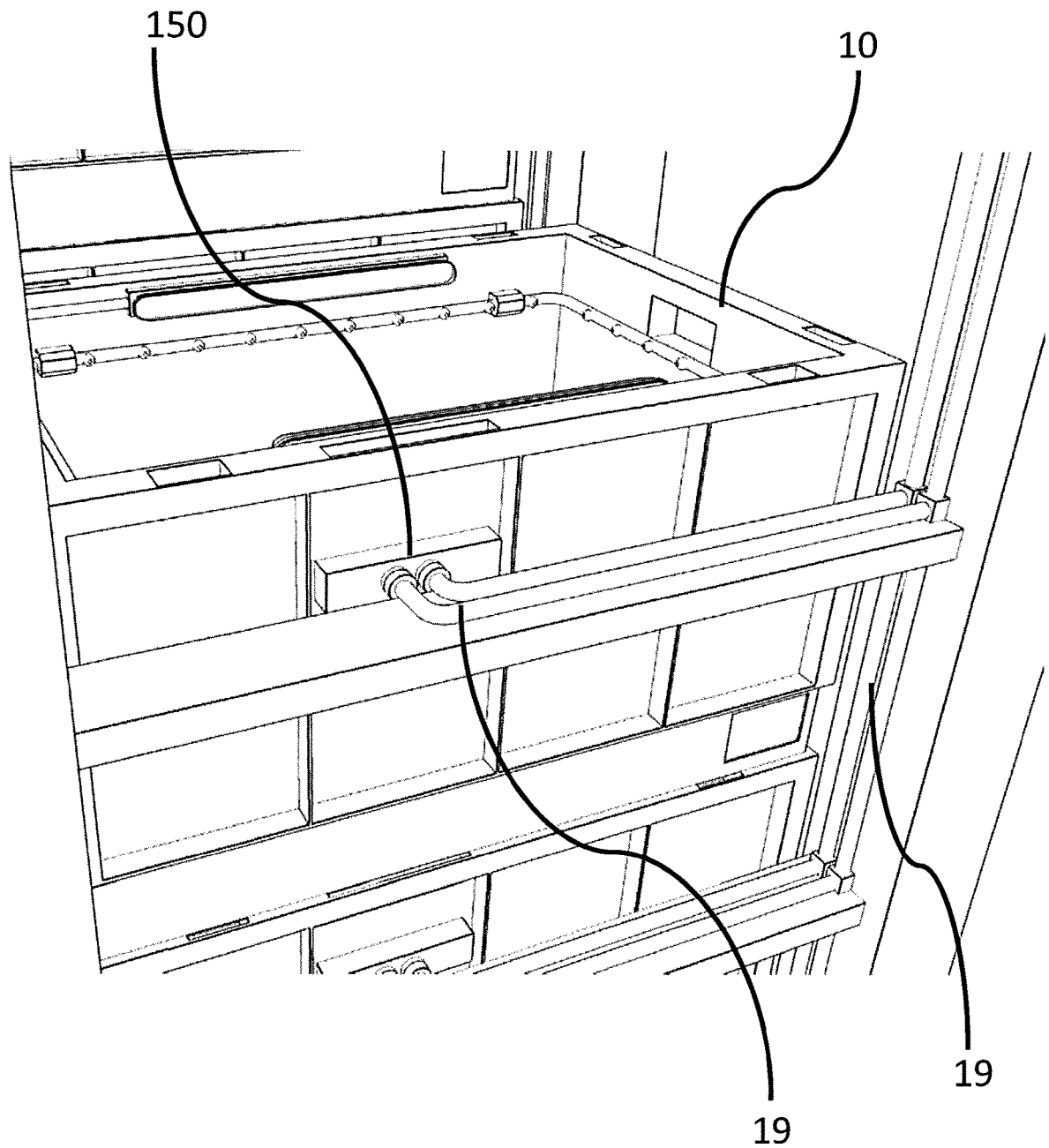

FIG. 5a is a schematic perspective view of the frame structure of FIG. 1 in accordance with one aspect of the invention, the frame structure comprising a grid system mounted on uprights;

FIG. 5b is an expanded schematic representation of the structure of FIG. 5b showing connectors, cables, lighting means and pipework in accordance with one form of the invention;

FIG. 6 is one alternative form of container 10' compatible with the framework and grid structure of FIGS. 5a and 5b, the container comprising a tray-like base and structural and load bearing edges but transparent sides or in accordance with another aspect of the invention, no sides;

FIG. 7 is a schematic view of the frame structure of FIG. 5 in accordance with one aspect of the invention showing the uprights carrying services from the base of the storage system to the grid, a number of the containers of FIG. 6 being located within the framework 14 beneath the grid;

FIG. 8 is a schematic view of the frame structure of FIGS. 5a, 5b and 7 in accordance with a further aspect of the invention, the containers of yet another alternative configuration being located within the framework, the alternative configuration containers further comprising connecting means and other services routing via the containers;

FIG. 9 shows the alternative configuration container of FIG. 8 outwith the framework structure, showing connecting means in additional detail, in addition to lighting means and fluid supply means within the container;

FIG. 10 shows an expanded view of the framework structure of FIG. 8 showing a connector positioned so as to co-operate with the connector of the container of FIG. 9; and FIG. 11 shows an expanded schematic perspective diagram of the container of FIG. 9 in situ within the framework of FIG. 10 showing the two cooperating surfaces of the connectors in contact.

In use, as shown in FIGS. 1 and 2, stackable containers, known as bins 10, are stacked on top of one another to form stacks 12. The stacks 12 are arranged in a frame structure 14 in a warehousing or manufacturing environment. FIG. 1 is a schematic perspective view of the frame structure 14, and FIG. 2 is a top-down view showing a single stack 12 of bins 10 arranged within the frame structure 14. Each bin 10 typically holds a plurality of product items (not shown), and the product items within a bin 10 may be identical, or may be of different product types depending on the application.

The frame structure 14 comprises a plurality of upright members 16 that support substantially horizontal members 18, 20. A first set of substantially parallel substantially horizontal members 18 is arranged perpendicularly to a second set of substantially parallel substantially horizontal members 20 to form a plurality of horizontal grid structures supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, are arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 are lifted clear of the rails 22, and the second set of wheels 36 are lowered into engagement with the second set of rails 22a. The drive mechanism can then be used to drive the second set of wheels 36 to achieve movement in the Y direction.

In this way, one or more robotic load handling devices 30 can move around the top surface of the stacks 12 on the frame structure 14 under the control of a central picking system (not shown). Each robotic load handling device 30 is provided with means for lifting out one or more bins or containers from the stack 12 to access the required products. In this way, multiple products can be accessed from multiple locations in the grid and stacks at any one time.

It will be appreciated that if the required container 10 is not at the top of the stack 12, if each load handling device can only carry a single container 10 then multiple load handling devices will need to co-operate in order to access the target container 10.

FIG. 4 shows a typical storage system as described above, the system having a plurality of load handling devices 30 active on the stacks 12 in order to co-operate to retrieve and replace containers 10 from and to the stacks 12. Unwanted containers 10 removed from stacks 12 in the pursuit of a target container 10 are placed back in to the stacks 12 at vacant positions.

FIGS. 1 and 4 show the bins 10 in stacks 12 within the storage system. It will be appreciated that there may be a large number of bins in any given storage system and that many different goods may be stored in the stacks, each bin may contain different goods within a single stack 12 or similar goods in similar stacks or multiple inventory items in an individual container 10. Whilst the above described system was conceived to store and retrieve groceries in an online shopping e-commerce solution, it will be appreciated that other uses are envisaged and that other items such as parcels and letters may be stored in the containers 10.

FIGS. 5a and 5b show the frame structure of the storage system without the bins 10 in situ. The uprights 16 and the framework 14 comprise extruded metal beams having a contoured cross sections. The metal beams are formed from aluminium alloys. However, it will be appreciated that any other suitable material having the appropriate structural characteristics for the intended use of the system may be used to form the grid 14 and uprights 16. For example, the grid 14 and the uprights 16 may be formed from steel, wood and various plastics for grid value, engineering.

As shown in FIG. 6, one alternative form of container 10' compatible with the framework and grid structure of FIGS. 5a and 5b, comprises a tray-like base and structural and load bearing edges, having but transparent sides or in accordance with another aspect of the invention, no sides. In the situation where the uprights 16 of the framework 14 carry, for example power to supply lighting means 60, the lighting means being located or position on the framework 14, if the containers 10 were formed from opaque materials, the light would not penetrate the structure of the container. Advantageously, as long as any container is capable of supporting the containers above in the stack then there is no requirement for the container to comprise full sides and a tray-like configuration having a base 92 and edges 94 acting as structural supporting members for the containers above in the stack 12.

FIG. 7 shows the frame structure of FIGS. 5a and 5b, the uprights 16, routing services 17 within the contours of the beams, around the storage system. Such services may comprise power, sensor systems, system control means or any other service that may be required within the framework of the storage system. As shown in FIG. 7, one specific example of a service supplied around the storage system is the routing of fluid supply means 19. The fluid supplied from the fluid supply means may be, for example water in the manner of a sprinkler system to be deployed in the event of a fire or to water crops located in the containers. Alternatively, the fluid supply 19 system may comprise gas such as $CO_2$, as used in greenhouse applications or $N_2$ used as a fire suppressant.

The fluid to be supplied round the framework 14 is routed upwardly from the base of the system via connectors 17. The connectors 17 being adapted so as to be able to route carry or transmit multiple utilities or services such as communication means, signals, fluids, light or any other service that may be required in the framework 14 of the system.

In use, the load handling devices 30 are operative on the grid portion of the framework structure 14. The load handling devices move laterally above the stacks 12 of containers 10. The uprights 16 of the framework structure 14 are supporting the load handling devices above the stacks 12.

Due to the automated nature of such densely packed and large storage systems, visual inspection of the integrity and alignment of the structure is impossible whilst the system is in use. In order to inspect the structure visually the load handling devices would need to be shut down and a physical inspection undertaken. The down time involved in this operation would be extremely costly.

In a further aspect of the invention, the uprights 16 and indeed the under surface of the substantially horizontal grid system may be used to carry sensor means, the output of which may be logged by a data logger mounted on the structure or in a service providing bin 10 in the vicinity, or the information and data may be transmitted to a central data logging system via wireless communications or via other data transfer means such as optical cabling, again routed via the framework structure 14.

Such sensor means may comprise laser monitoring devices, laser beams being transmitted on to a portion of the framework, the shape of the reflected beam being monitored for changes representative of structural or alignment issues with the framework. It will be appreciated that other structural monitoring means may be used such as sensors comprising electrical connections to the framework 14, for example potential drop techniques for monitoring crack growth within the framework structure.

Other sensor means that may be mounted on the framework structure may include camera means such as, but not limited to, CCD cameras. Cameras mounted on the uprights 16 may be used to monitor the system whilst in use, the images being transmitted either wirelessly or via suitable communications means, to a remote monitoring system.

It will be appreciated that any type and method of communication may be used, for example WiFi, Bluetooth, 3-wire serial, SigFox or other proprietary systems such as that described in UK Patent Application No. GB1509793.4 to Ocado Innovation Limited, the contents of which in hereby incorporated by reference. It will be appreciated that any other suitable communications means or protocol may be used.

It will be appreciated that cameras may be used in conjunction with other sensors to enable remote visual inspection of the storage system should one of the other sensor systems be triggered due to a fault in the framework.

In this way, the structural condition of the framework 14 may be monitored continuously whilst the storage system is in use.

In a second aspect of the invention, the uprights 16 and the grid 14 may be used to carry services that may be required by other aspects of the system. For example, power may be transmitted along suitable cables routed on the framework structure. Depending on the use of the storage system, the containers 10 may require power. Individual containers 10 may comprise heating means, cooling means, freezing means or lighting means 60. These services would require power that may be transmitted round the framework. It will be appreciated that due to the nature of operation of the system it is preferable that the containers 10 are not in fixed or releasable contact with the framework.

However, it will be appreciated that non contacting methods of transmitting the required power to individual containers 10 may be used, for example magnetic induction or RF induction. In this way, power is supplied to the service means in individual containers 10 without the need for the container to be in contact with the upright 16. The uprights 16 are located adjacent the corners of the containers 10 and each upright 16 has guiderails for the corners of the container. It will be appreciated that there will be some tolerance between the guiderails and the containers 10, for example approximately 5 mm in the case of a grid for storage and retrieval of inventory items in an order fulfillment centre.

The robotic load handler 30 comprises a gripper, the gripper being larger than the container and ensuring that the container is always guided squarely on top of the container located below in a stack 12. In this arrangement, it will be appreciated that it is possible to provide contact brushes between the containers 10 in a stack 12 and the grid uprights 16. It will be appreciated that these contact brushes may be located along the edge of each container 10. In an alternative form of container shown in FIGS. 9 and 10, contacts 150a are provided on the container 10 that co-operate with contacts 150b on the framework 14 in order to provide, for example, electrical connectivity between containers 10 and the framework 14. It will be appreciated that these connections 150a and 150b may not be permanent as the container 10 may need to be removed from the framework structure 14. Accordingly releasably latching connections may be used or electrically conductive conducting pads operating on a friction basis only may be used. It will be appreciated that other forms of connector may be used suitable for fulfilling this function.

The stackable containers 10 may be provided with electrical connections between containers 10 in a stack 12 as shown in FIGS. 9 and 10. These may comprise electrically conductive pads on co-operating surfaces of adjacent bins. In this way power transmitted to a stack 12 via a single non-contacting point between the upright 16 and a container 10 may be transmitted throughout the stack 12. Furthermore, the containers 10 in a stack may be provided with releasable latching mechanisms to physically and/or electrically connect adjacent containers 10 in a stack 12 together. Such latching mechanisms may comprise magnetic or electromagnetic latching means or any other suitable form of releasable latching mechanism. (see FIGS. 9 and 10)

FIG. 11 shows an expanded version of FIGS. 9 and 10 with the container 10 in situ within the framework 14 of the storage and retrieval system. The connectors 150a and 150b are in frictional contact sufficient to allow electrical connection therebetween. It will be appreciated that this is a simplified representation of a suitable form of connecting means and that a person skilled in the art may envisage other configurations. Any configuration of connection capable of electrical contact in such a situation may be used.

In a third aspect of the invention, the framework 14 carries physical services such as fluids around the system. As shown in FIG. 7, pipes 19 may be routed around the framework carrying water or gas. The pipework may be arranged to route fluids to individual containers 10. Alternatively, fluids may be releasable in to the atmosphere in the vicinity of the stacks 12. For example, certain containers 10 may contain ignitable products such as matches. In the event that the matches ignite, sensors within the framework would detect the heat, fire or smoke, and a visual inspection via a camera may identify an individual container 10. Water may be directed in to that individual container 10. In this way, a fire may be contained within a single container 10 or a few containers.

In a conventional warehouse situation, sprinklers may be deployed from the roof of the warehouse. In a storage system as described herein, this may cover a large area and could be above the level of the grid. Such a sprinkler deployment could severely damage load handling devices as well as causing damage across a large area of the system resulting in costly shut down and replenishment of goods. Restricting the sprinkler deployment to the area beneath the grid 22 and the load handling devices may prevent costly damage.

Other fire suppressant means utilise gases such as nitrogen to starve any fire of oxygen. In the event of a gas deployment, again this could be directed at individual containers 10 but may also be in the vicinity of a stack 12 or a number of stacks 12. It will be appreciated that a lack of oxygen in the atmosphere in a given area of the system may cause danger should maintenance be required by personnel. Use of gas sensors within the framework 14 will establish if the environment is safe to inspect.

The uprights 16 and the underside of the grid 14 may be provided with connectors for connection of the containers 10 or the stacks 12 of containers 10 to the framework 14. For example, provision of power, data, signals and services on the framework requires connection to the containers via suitable connections, if the services are to be utilised by the containers 10. Any suitable connection means may be used that can connect to a container or to which containers 10 can releasably connect. For example telescopic umbilicals may be used that can extend to connect the containers 10 to the grid.

The uprights 16 and the framework 14 may be provided with sensing means capable of identifying individual containers 10, stacks 12 of containers or objects contained within the containers 10. Sensing means may comprise barcodes on the containers 10 and barcode readers on the uprights, alternatively camera means may be utilised. Any suitable method of labelling individual containers and reading said labels may be used to achieve the same objective.

In use, the identification and the location of given containers 10 by sensing means on the framework 14 enables the system to establish the identity, and hence contents, of individual containers adjacent to sensors, connectors and service means. In this way individual containers 10 may be controlled, monitored or treated by means provided on the framework 14 of the grid. For example said sensor and controlling means may control the temperature in individual containers 10; control the level of nutrients applied to the content of individual containers 10; communicate with the content of individual containers 10; and transmit data via the content of individual containers 10.

It will be appreciated that due to the presence of the load handling devices 30 on the grid 22 that the services provided within the framework 14 via the uprights will need to be routed from the base of the storage system.

It will be appreciated that in all aspects of the invention, the services provided on the framework 14 are not limited to those specifically described and that and service that may be routed via the uprights and the underside of the grid 22 may be installed.

Moreover, the embodiments described above and detailed in the accompanying figures assume that the storage system comprises containers 10 in stacks 12 disposed within a framework 14 in an unfettered manner. It will be appreciated that the system may be partitioned by suitable partitioning means into smaller sub sections defined by, for example temperature. In this way it would be possible to have an ambient portion, a chilled portion and a frozen portion for example. It will also be appreciated that the partitioning may have additional advantages, for example, partitioning enables sections of the storage system to be isolated from other sections. This may be necessary if there is a fire, for example, and fire suppressant means are used in a given area to extinguish the fire. Furthermore, in the case where the system is used for alternative uses, there may be advantages in having different gaseous atmospheres in different portions of the system. This may be achieved by partitioning the system. It will be appreciated that the partitioning means may be temporary and remotely deployable, for example roller shutters disposed under the grid.

UK Patent Application No GB1518117.5 (Ocado Innovation Limited) hereby incorporated by reference describes in detail many configurations of partitioning such a storage and retrieval system in order to protect a workforce or mitigate an incident such as a fire, a spillage or a sprinkler deployment, accidental or otherwise. This is achieved by either permanently or temporarily partitioning sections of the framework structure 14 such that incidents are contained in one part of the grid. Should temporary partitions be utilised in a smart grid and framework system described above, such as an airbag type partition, these could be mounted on the grid and their deployment or activation initiated in response to signals generated by sensor means located on the framework 14 and powered by services routed via the framework 14. The temporary partitions themselves could be mounted on the framework system 14.

Many forms of containers 10 may be envisaged for use with a Smart Grid system described above and need not be limited to the configurations described above and shown in the accompanying Figures. UK Patent Application No. GB1518091.2 (Ocado Innovation Limited) hereby incorporated by reference describes alternative forms of smart container 10 that may be used in association with the framework described above. In common with the containers 10 and 10' described in the present application above, the configurations described therein comprise connectors capable of connecting via physical or non-contacting means with cooperating connectors on surfaces of the containers 10 that will be in contact when the containers 10 are in stacks 12 within the framework 14.

It will be appreciated that the services described above for routing through the framework may be routed via cables, pipes, wires, tubes or integrated mouldings within the framework structure. However, such cables, pipes, wires may be mounted on any of the surfaces of the framework 14 extrusions.

Many variations and modifications not explicitly described above are also possible without departing from the scope of the invention as defined in the appended claims.

The invention claimed is:

1. A storage system comprising:
   a first set of parallel rails or tracks and a second set of parallel rails or tracks extending transverse to the first set in a substantially horizontal plane to form a grid pattern having a plurality of grid spaces;
   a set of uprights, the uprights and tracks together defining a framework;
   a plurality of storage containers arranged in stacks, located beneath the rails and within the framework;
   at least one load handling device disposed on and above the rails or tracks, the at least one load handling device including a body mounted on wheels, a first set of wheels arranged to engage with two rails of the first set of parallel rails, a second set of wheels arranged to engage with two rails of the second set of rails, the first set of wheels being independently moveable and driveable with respect to the second set of wheels such that when in motion only one set of wheels is engaged with the tracks or rails at any one time thereby enabling movement of the load handling device along the rails to any point on the grid by driving only the set of wheels engaged with the tracks or rails, the at least one load handling device including a lifting device arranged to lift one or more containers, or parts thereof, from a stack;
   wherein the framework includes a service means for providing services to the storage system and the containers located therein enabling interaction, control and monitoring of the system from within the framework.

2. The storage system according to claim 1, wherein a portion of the framework comprises:
   a power control means.

3. The storage system according to claim 1, wherein a portion of the framework comprises:
   a sensor means and a data logging means for monitoring the output of the sensor means.

4. The storage system according to claim 1, wherein the framework comprises:
   a communication means for communicating with adjacent containers or with a central communications manager.

5. The storage system according to claim 1, wherein some or all of the containers comprise:
   a heating means for heating the contents of containers.

6. The storage system according to claim 1, wherein some or all of the containers comprise:
   a cooling means for cooling the contents of containers.

7. The storage system according to claim 1, wherein some or all of the containers comprise:
   a reservoir, the reservoir acting as a fluid sink in the container.

8. The storage system according to claim 1, wherein some or all of the containers comprise:
   a lighting means.

9. The storage system according to claim 8, wherein the lighting means comprises:
   a lid removeably attached to a respective container in the stack.

10. The storage system according to claim 1, wherein an individual container in the stack is provided with a unique identity, the identity being traceable and trackable by a sensor and a monitoring means.

11. The storage system according to claim 1, wherein the framework comprises a connection means for connecting the framework to the containers within the stacks, thereby enabling interaction between the framework and the containers, and enabling services to be provided thereto.

12. The storage system according to claim 1, wherein a portion of the framework comprises:
    a power supply means.

13. The storage system according to claim 12, wherein a portion of the framework comprises:
    a power control means.

14. The storage system according to claim 13, wherein a portion of the framework comprises:
    the sensor means and the data logging and storage means for monitoring the output of the sensor means.

15. The storage system according to claim 14, wherein the framework comprises:
    a communication means for communicating with adjacent containers or with a central communications manager.

16. The storage system according to claim 15, wherein some or all of the containers comprise:
    a heating means for heating the contents of containers.

17. The storage system according to claim 16, wherein some or all of the containers comprise:
    a cooling means for cooling the contents of containers.

18. The storage system according to claim 17, wherein some or all of the containers comprise:

a reservoir, the reservoir acting as a fluid sink in the container.

19. The storage system according to claim 18, wherein some or all of the containers comprise:

a lighting means.

20. The storage system according to claim 19, in which an individual container in the stack is provided with a unique identity, the identity being traceable and trackable by a sensor and a monitoring means.

21. A method of condition monitoring a storage system including a first set of parallel rails or tracks and a second set of parallel rails or tracks extending transverse to the first set in a substantially horizontal plane to form a grid pattern having a plurality of grid spaces, a set of uprights, the uprights and tracks together defining a framework, a plurality of storage containers arranged in stacks, located beneath the rails and within the framework, at least one load handling device disposed on and above the rails or tracks, the at least one load handling device including a body mounted on wheels, a first set of wheels arranged to engage with two rails of the first set of parallel rails, a second set of wheels arranged to engage with two rails of the second set of rails, the first set of wheels being independently moveable and driveable with respect to the second set of wheels such that when in motion only one set of wheels is engaged with the tracks or rails at any one time thereby enabling movement of the load handling device along the rails to any point on the grid by driving only the set of wheels engaged with the tracks or rails, the at least one load handling device including a lifting device arranged to lift one or more containers, or parts thereof, from a stack, the method comprising:

a. providing a sensor means and a data logging and storage means within the framework formed by first and second parallel rails or tracks and a set of uprights;

b. providing a communication means to communicate data logged within the framework to a central data logging device; and c. monitoring the data received.

* * * * *